United States Patent [19]
Hellsten et al.

[11] Patent Number: 5,911,236
[45] Date of Patent: Jun. 15, 1999

[54] ALKOXYLATED ALKANOLAMIDE TOGETHER WITH AN IONIC SURFACTANT AS FRICTION-REDUCING AGENT

[75] Inventors: Martin Hellsten, ÖdsmÅl; Ian Harwigsson, Malmö ; Carina Brink, V:AFrölunda, all of Sweden

[73] Assignee: Akzo Nobel nv, Arnhem, Netherlands

[21] Appl. No.: 08/809,639

[22] PCT Filed: Sep. 22, 1995

[86] PCT No.: PCT/SE95/01081

§ 371 Date: Mar. 26, 1997

§ 102(e) Date: Mar. 26, 1997

[87] PCT Pub. No.: WO96/10616

PCT Pub. Date: Apr. 11, 1996

[30] Foreign Application Priority Data

Oct. 3, 1994 [SE] Sweden .................................. 9403363

[51] Int. Cl.$^6$ ............................... F17D 1/16; F17D 1/18; C10M 141/00
[52] U.S. Cl. ........................... 137/13; 508/389; 508/411; 508/503; 508/547; 508/555
[58] Field of Search ..................................... 508/555, 389, 508/411, 503, 547; 507/90; 137/13

[56] References Cited

U.S. PATENT DOCUMENTS

| | | | |
|---|---|---|---|
| 3,373,107 | 3/1968 | Rice | 508/555 |
| 3,676,344 | 7/1972 | Kuceski | 508/555 |
| 4,640,791 | 2/1987 | Deck et al. | 508/555 |
| 4,828,735 | 5/1989 | Minagawa et al. | 508/555 |
| 5,080,814 | 1/1992 | Awad | 508/555 |
| 5,339,855 | 8/1994 | Hellsten et al. | 137/13 |

FOREIGN PATENT DOCUMENTS 2 238 560  6/1991  United Kingdom ............ C09K 7/00

*Primary Examiner*—Margaret Medley
*Attorney, Agent, or Firm*—Ralph J. Mancini

[57] ABSTRACT

The use of a mixture of at least one alkanolamide of general formula (I), $RC(O)NH(A)_nH$, wherein R is a hydrocarbon group having 7–23 carbon atoms, preferably 11–23 carbon atoms, A is an alkyleneoxy group having 2–4 carbon atoms and n is 2–12, preferably 2–8, and at least one ionic surfactant selected from the group consisting of anionic, cationic, amphoteric and zwitterionic, in a proportion between the alkoxylated alkanolamide and the ionic surfactant from 100:1 to 1:2, preferably in the range from 50:1 to 1:1 for producing a water-base liquid system with reduced flow resistance between the flowing, water-base liquid system and a solid surface.

9 Claims, No Drawings

ALKOXYLATED ALKANOLAMIDE TOGETHER WITH AN IONIC SURFACTANT AS FRICTION-REDUCING AGENT

The present invention relates to the use of an alkoxylated alkanolamide together with an ionic surfactant in a water-base system for reducing the flow resistance between a solid surface and the water-base liquid system.

Surfactants with the ability to form extremely long, cylindrical micelles have, in recent years, attracted a great interest as friction-reducing additives to systems with circulating water, especially those destined for heat or cold distribution. An important reason for this interest is that, although one desires to maintain a laminar flow in the conduits, one wishes at the same time to have turbulence in the heat exchangers to achieve therein a high heat transfer per unit area.

The rod-shaped micelles are distinguished by operating in a fairly disorderly fashion at low Reynold's numbers (below $10^4$) having no or only a very slight effect on the flow resistance. At higher Reynold's numbers (above $10^4$), the micelles are paralleled and result in a friction reduction very close to that which is theoretically possible. At even higher Reynold's numbers (e.g. above $10^5$), the shear forces in the liquid become so high that the micelles start to get torn and the friction-reducing effect rapidly decreases as the Reynold's number increases above this value.

The range of Reynold's numbers within which the surface-active agents have a maximum friction-reducing effect is heavily dependent on the concentration, the range increasing with the concentration. By choosing the right concentration of surface-active agents and suitable flow rates in tubings and heat exchangers, it is thus possible to establish a laminar flow in the tubes and turbulence in the heat exchangers. Thus, the dimensions of both the tubes and the exchangers can be kept at a low level, or the number of pump stations, and consequently the pump work, can alternatively be reduced while retaining the same tubular dimensions.

The surface-active agents most commonly used as friction-reducing additives to circulating water systems for heat or cold distribution are of the type represented by alkyltrimethyl ammonium salicylate wherein the alkyl group is a long alkyl chain which has 16–22 carbon atoms and which may either be saturated or contain one or more double bonds. This type of surface-active agent functions satisfactorily already at a concentration of 0.5–1 g/l, but is degraded very slowly, both aerobically and anaerobically, and further is highly toxic to marine organisms.

Since heat-distribution systems for small houses usually suffer from important leaks (it is estimated that in one year 60–100% of the water leaks out), it follows that the added chemicals end up in the ground water and in various fresh-water recipients. This combination of low biodegradability and high toxicity is a fundamental criterion for a product injurious to the environment.

In the U.S. Pat. No. 5,339,855 it is described that alkoxylated alkanolamides with the general formula

wherein R is a hydrocarbon group having 9–23 carbon atoms, A is an alkyleneoxy group having 2–4 carbon atoms and n is 3–12 are capable of forming long cylindrical micelles in water and thus reduce the friction in water-based system. These products are easily degradable and function excellently in deionized water especially at low temperatures. However, the friction-reducing effects are hampered in hard water and by the presence of high amounts of electrolytes. Further the temperature range for their optimal friction-reducing effect will be rather narrow, sometimes as small as 10 degrees centigrade.

It has now surprisingly been found that mixtures of the alkoxylated alkanolamides described above in combination with ionic surfactants can give a water-base liquid system the desired friction-reducing properties in both hard and salt water and also a substantially increased temperature range for the optimal effect, e.g. 30 degrees centigrade. It is possible to obtain a satisfactory friction-reducing effect even when the hardness is as high as 500 ppm $CaCO_3$ and the salt content is 5 gram per litre of the water-base liquid system.

The weight ratio between the alkoxylated alkanolamide and the ionic surfactant may be varied between 100:1 and 1:2, preferably 50:1 and 1:1. Besides the structure of the two surface active components the weight ratio also depends on the hardness and salt content of the water and the desired temperature working range for the water-base liquid system. The total amount of the alkoxylated alkanolamide and the ionic surfactant may vary within wide limits depending on the conditions, but is generally 100–10 000 $g/m^3$ of the water-base system. By "water-base" is meant that at least 50% by weight, preferably at least 90% by weight, of the water-base liquid system consists of water. The combination of alkoxylated alkanolamide and ionic surfactant is especially suited for use in water-base systems flowing in long conduits, e.g. circulating water systems for heat or cold distribution.

The preferred alkoxylated alkanolamides are those where R contains 13–23 carbon atoms, A has 2 carbon atoms and n is a number from 3 to 6. For cooling water applications when the water temperature is below 30° C., preferably at least a part of the hydrocarbon groups R has one or more double bonds.

The alkoxylated alkanolamide can be produced by amidation of a carboxylic acid of the formula RCOOH, wherein R has the meaning stated above, with an alkanolamine of the formula $NH_2AH$, wherein A has the meaning stated above, or by aminolysis of a corresponding triglyceride or methyl ester with the above mentioned alkanolamine followed by alkoxylation of the resulting amide. The alkoxylation may be carried out in the presence of an alkaline catalys;: at a temperature of 140–180° C.

It is especially suitable to carry out the alkoxylation in the presence of a tertiary amine lacking protons that react with alkylene oxide, or an alkylene-oxide-quaternised derivative of the tertiary amine at a temperature ranging from room temperature to 120° C., which results in high yields of the desired product. Suitable tertiary amines include trimethylamine, triethylamine, tributylamine, dimethylactylamine, tetramethylethylenediamine, dimethyl coconut amine, tristearyl amine, dimethyl piperazine and diazabicyclooctane.

The alkoxylation may comprise ethoxylation, propoxylation, reaction of propylene oxide and ethylene in blocks, simultaneous reaction of ethylene oxide and propylene oxide, or a combination thereof. The ethylene oxide conveniently amounts to at least 50 mole per cent of the added alkylene oxide. To use only ethoxylation is preferred.

The carboxylic acids of the formula RCOOH, wherein R has the meaning stated above, may be aliphatic, aromatic as well as cyclo-aliphatic. Suitable carboxylic acids include the aliphatic carboxylic acids in which the hydrocarbon part may be saturated or unsaturated, straight or branched. To use conventional fatty acids is especially preferred.

Suitable alkoxylated alkanolamides include the following specific examples:

wherein

is derived from rape oil fatty acid,

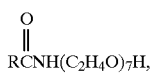

wherein

is derived from rape oil fatty acid,

wherein

is derived from lauric acid,

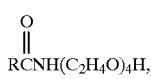

wherein

is derived from lauric acid,

wherein

is derived from stearic acid, and the group A is random added from equal mole parts of ethylene oxide and propylene oxide

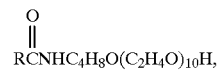

wherein

is derived from linolenic acid.

The choice of chain length and degree of unsaturation is determined by the temperature range in which the alkoxylated alkanolamide is to operate but also by the kind and amount of the ionic surfactant which will be included in the mixture and the hardness and salt content of the water used.

The general principle is then that a hydrophobic alkoxylated alkanolamide, i.e. an alkoxylated alkanolamide with a large hydrocarbon group and a low degree of alkoxylation will need a rather hydrophilic ionic surfactant, i.e. an ionic surfactant with a short to moderate hydrocarbon group and a large hydrophilic group or even two or more hydrophilic groups.

The use of hard or salt water will have the same effect as making the alkoxylated alkanolamide more hydrophobic, i.e. it creates a demand for either a higher amount of the ionic surfactant or a more hydrophilic ionic surfactant. A convenient way to find out the right proportion between the ionic surfactant and the alkoxylated alkanolamide is to disperse the latter in the water that shall be used at the highest temperature in the planned operational temperature range and then add successively a solution of the ionic surfactant until the dispersed alkoxylated alkanolamide just has been solubilized.

The ionic surfactant may be chosen from any of the known classes, i.e. anionic, cationic, amphoteric or zwitterionic.

Suitable anionic surfactants according to the invention are fatty acid soaps, $R_1COO^-Me^+$, alkylpolyglycolethersulphates $R_1O(C_xH_{2x}O)_nSO_3^-Me^+$, alkylsulphates $R_1OSO_3^-Me^+$, alkylsulphonates $R_1-SO_3^-Me^+$, alkylarenesulphonates $R_1-Ar-SO_3^-Me^+$, alkylpolyglycolethercarboxylates $R_1O(C_xH_{2x}O)_nCH_2COO^-Me^+$, where $R_1$ means a hydrocarbon chain with 8–22 carbon atoms, Ar an aromatic hydrocarbon group preferably with 6 carbon atoms, $Me^+$ a monovalent cation, x is a number from 2–4 and n is a number from 1–4.

Suitable cationic surfactants according to the invention are primary ammonium salts $R_1^+NH_3A^-$, secondary ammonium salts $R_1^+NH_2R'A^-$ and tertiary ammonium salts $R_1^+NH(R')_2A^-$ where $R_1$ has the same meaning as given above, R' is methyl, ethyl, propyl or hydroxyethyL group and $A^-$ is a monovalent anion.

Quaternary alkylammonium compounds such as lauryl- or myristyltrialkylammoniumhalogenid can also be used but are not generally recommended due to their slow biodegradation and comparatively high toxicity against marine organisms.

Suitable amphoteric and zwitterionic surfactants are those containing
  i) one or more, preferably one or two, monovalent hydrophobic groups, preferably hydrocarbon groups, forming a hydrophobic portion containing 10–36 carbon atoms, ii) one or more, preferably one or two, primary, secondary or tertiary amine groups or quaternary ammonium groups iii) one or more, preferably one or two carboxylic groups and having a molecular weight of less than 1400. The amphoteric or zwitterionic surfactants may also contain one or more non-ionic, hydrophilic groups, such as hydroxyl groups and ether groups. Their effect on the environment is low, especially in comparison with the previous used quaternary cationic friction-reducing agents.

Example of suitable amphoteric and zwitterionic surfactants are those with the formulae

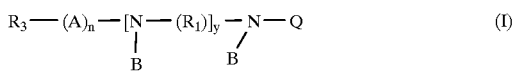
(I)

wherein $R_3$ is a hydrocarbon group having 7–24 carbon atoms, n is 0 or 1, A is a carbonyl group [C(O)], a group $(OCH_2CH_2)_z$ or a group $(OC_3H_6)_z$ in which z is an integer from 1 to 5, $R_1$ is a lower alkyl group having 2–3 carbon group, y is an integer from 0 to 4, Q is a group $—R_2COOM$ in which $R_2$ is an alkylene group having 1–6 carbon atoms and M is hydrogen or an ion selected from the group consisting of alkali metals, alkaline-earth metals, ammonium and substituted ammonium, and B is hydrogen, a hydroxyalkyl group having 2–4 carbon atoms or a group Q as defined above,

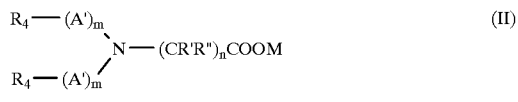
(II)

and

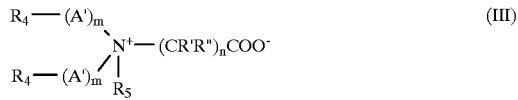
(III)

wherein $R_4$ are straight or branched alkyl or alkenyl groups with 7 to 24 carbon atoms, M has the meaning mentioned in formula (I), n is an integer of 1 to 4 and R' and R" independent of each other are hydrogen, alkyl- or hydroxyalkyl groups with 1 to 3 carbon atoms or hydroxyl groups, m is 0 or 1 and A' is a group containing an ester group or a group containing an amido function and is a group 1) $—(O—CH_2—CHR''')_p—O—C(O)—(CH_2)_q—$
2) $—C(O)O—CHR'''—CH_2—(O—CHR'''—CH_2)_p—$
3) $—(O—CH_2—CHR''')_p—O—C(O)—O—CHR'''—CH_2—(O—CHR'''—CH_2)_p—$
4) $—C(O)—O—CH_2—C(OH)H—CH_2—$ or
5) $—C(O)—NH—(CH_2)_z—$ wherein R''' is hydrogen or a methyl group, p is 0 to 5, q is 1 or 2 and z is 2 or 3 and $R_5$ is an alkyl or hydroxyalkyl group with 1 to 4 carbon atoms, and

(IV)

-continued

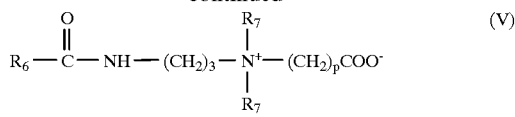
(V)

wherein $R_6$ is a longer hydrophobic hydrocarbon group, which suitably consists of a saturated or unsaturated, straight or branched aliphatic hydrocarbon group having 7–24 carbon atoms and preferably is an alkyl or alkenyl group having 11–17 carbon atoms. $R_7$ is an alkyl or hydroxyalkyl group having 1–4 carbon atoms, preferably the methyl group, and p is 1 or 2.

Apart from the alkoxylated alkanolamide and the ionic surfactant the water-base system may contain a number of conventional components, such as rust-preventing agents, anti-freeze, and bactericides. The system may also include solubilisers, such as diethylene glycol monobutyl ethers, which may affect the cloud point of the surfactant mixture in the water-base system quite considerably.

The present invention will now be further illustrated with the aid of the following examples.

Test procedure

The friction-reducing properties of the products of the invention and the products according to the prior art have been tested according to two different methods, one rather simple procedure, which will be called the screening test, and one more elaborated streaming test, which will be called the loop test.

Screening test

A serie of 50 ml glass beakers of the same dimensions (65×35 mm) each containing a Teflon-covered cylindrical magnet (20×6 mm) were each filled with 40 ml test solution and then kept in a refrigerator at least 4 h at 3° C. The beakers were then taken out one by one, immediately placed on a magnetic stirrer, a thermometer immersed to a depth of 15 mm, the stirrer started at full speed, 1400 rpm, and the depth of the vortex formed in the solution was recorded at various temperatures while the solution temperature increased to room temperature during 15 mins.

When no vortex could be detected (recorded as 0 mm), it is known by experience that this indicate good friction reducing properties.

If on the other hand no efficient additive was present, e.g. for pure water the vortex reached down to the stirring magnet and the result was recorded as 35 mm.

Loop test

Measurements were carried out in a 6 m tube loop consisting of two straight and stainless tubes (3 m each), one tube having an inner diameter of 8 mm and the other having an inner diameter of 10 mm. Water was pumped through the tube loop by a centrifugal pump, which was driven by a frequency-controlled motor, for continuous adjustment of the flow rate, which was determined by a rotameter.

The straight parts of the tube loop had outlets which, with the aid of valves, could in turn be connected to a differential pressure gauge whose other side was all the time connected to a reference point in the tube loop. Further, the tube loop was heat-insulated, and the suction side of the pump was connected to a thermostatically controlled container with a volume of 20 1, to which the return flow from the tube loop was directed.

After the testing compound had been added and the aqueous solution ha been thermostatically controlled, measurements began at low flow rates, and the pressure difference from two points on the 10 mm tube and three points on the 8 mm tube were measured for each flow rate. The pressure differences thus measured were then converted into Moody's friction factory Y and are shown in the examples as a function of the Reynold's number Re.

$Y = 2D \cdot P_{diff}/V^2 \cdot L \cdot d$
$Re = D \cdot V \cdot d/u$
D = tube diameter
V = flow rates
L = tube length over which the pressure difference $P_{diff}$ was measured
d = density of the liquid
u = viscosity of the liquid The examples also state the corresponding Prandtl number and Virk number. The former corresponds to the friction factor of water only, i.e. with turbulence, and the latter corresponds to flow without turbulence, i.e. a laminar flow.

EXAMPLES 1–4

These examples were carried out according to the screening test described previously.

The alkoxylated alkanolamides used in these examples were monoethanolamides of technical oleic acid to which had been added 3 resp. 4 moles of ethylene oxide. These products will in the following be called OMA-3 resp. OMA-4. The technical oleic acid consists of 60% oleic acid, 20% linoleic acid and 10% linolenic acid the rest being mainly palmitic and stearic acids.

As anionic surfactants have been used a technical laurylpolyglycolethersulphate and a technical laurylsulphate. In both cases is the alkyl group emanating from a technical lauryl alcohol consisting of 60% lauryl alcohol, 30% myristylalcohol, the rest being mainly decyl- and cetylalcohols.

In the case of the polyglycolethersulphate the technical lauryl alcohol has been ethoxylated with 2.8 moles of ethylene oxide before sulphation with sulphur trioxide followed by neutralization with sodium hydroxide. The two products will in the following be called LES (LaurylEtherSulphate) and FAS (Fatty Alcohol Sulphate). The water used in these examples was a hard water containing 2.2 moles $Ca^{2+}$ and 1.4 moles $Mg^{2+}$ per $m^3$ and as a corrosion inhibitor 1.3 kg $NaNO_2$, 0.35 kg $NaNO_3$ and 0.35 kg $NaBO_2 \cdot 4 H_2O$ per $m^3$.

The composition of the test solutions are given in the table below:

| Test solution | OMA-3 | OMA-4 | LES | FAS |
|---|---|---|---|---|
| | All conc. given in kg a.s per $m^3$ | | | |
| I | 3.0 | — | 1.0 | — |
| II | 3.0 | — | — | 2.0 |
| III | 1.5 | — | — | 1.0 |
| IV | 1.45 | 1.45 | 1.10 | — |
| Comparison 1 | 4.0 | — | — | — |
| Comparison 2 | — | — | 4.0 | — |

The test results are given as the depth of the vortex formed in mm at the stirrer speed of 1400 r.p.m.

| Temp °C. Test solution | 3 | 6 | 11 | 16 | 20 | 25 |
|---|---|---|---|---|---|---|
| I | 0 | 3 | 0 | 0 | 0 | 3 |
| II | 0 | 0 | 0 | 0 | 0 | 1 |
| III | 0 | 0 | 0 | 0 | 1* | 1* |
| IV | 0 | 0 | 0 | 0 | 1 | 2 |
| Comparison 1 | — | 5 | 8 | 8 | 5 | 5 |
| Comparison 2 | — | 15 | 15 | 15 | 15 | 10 |

The results of these tests indicate that the compositions according to the invention have a significant stabilizing effect on the water level in immediate vicinity of a turbulent zone and may thus be expected to have good friction-reducing ability on water flowing in a tube.

EXAMPLE 5

This example was carried out according to the screening test but the water used was deionized water to which had been added 3.0 moles of $Ca(NO_3)_2$ per $m^3$.

In this hard water were dissolved 3.0 kg OMA-3 and 0.11 kg FAS per $m^3$.

The result of test is given below:

| Temp °C. | 3 | 7 | 10 | 15 | 20 | 25 |
|---|---|---|---|---|---|---|
| Vortex, mm | 0 | 0 | 0 | 0 | 0 | 0 |

Although the water hardness in this example is about the same as in Examples 1–4 the total salt content is much lower because the corrosion inhibitor salts are lacking.

Through a substantial decrease of the amount of added ionic surfactant it is still possible to make a composition according to the invention with good stabilizing effect on the water level.

EXAMPLES 6

These examples were carried out according to the loop test. The water used was deionized to which had been added 125 g (1 mole) $MgSO_4$ per $m^3$ and the pH adjusted to about 8.

The composition under test consisted of 1.5 kg OMA-5, 0.4 kg OMA-3 and 0.10 kg Na-oleate per $m^3$ where OMA-5 has the same meaning as was described for OMA-3, but with the difference that 5 moles of ethylene oxide have been added to the oleic acid monoethanolamide instead of 3 moles.

The oleic acid in the Na-oleate has the same fatty acid composition as the oleic acid from which the monoethanolamides were made.

The following results were obtained.

Water temperature 7° C., pH 8.3

| | Moody's friction factor × $10^3$ | | | | | | |
|---|---|---|---|---|---|---|---|
| Reynolds number | $3 \times 10^3$ | $5 \times 10^3$ | $10^4$ | $2 \times 10^4$ | $3 \times 10^4$ | $4 \times 10^4$ | $6 \times 10^4$ |
| Prandtl number | 45 | 38 | 32 | 27 | 24 | 22 | 20 |
| 10 mm tube | 70 | 23 | 20 | 9 | 10 | 15 | 18 |
| 8 mm tube | 38 | 18 | 11 | 7 | 8 | 10 | 18 |
| Virk number | 25 | 18 | 11 | 7 | 6 | 5 | 4.5 |

Water temperature 12.5° C., pH 8.0

| | Moody's friction factor × $10^3$ | | | | | | |
|---|---|---|---|---|---|---|---|
| Reynolds number | $3 \times 10^3$ | $5 \times 10^3$ | $10^4$ | $2 \times 10^4$ | $3 \times 10^4$ | $4 \times 10^4$ | $6 \times 10^4$ |
| Prandtl number | 45 | 38 | 32 | 27 | 24 | 22 | 20 |
| 10 mm | 38 | 22 | 13 | 8.5 | 6.5 | 8 | 13 |

-continued

| | Moody's friction factor × 10³ | | | | | | |
|---|---|---|---|---|---|---|---|
| 8 mm tube | 23 | 12 | 8.5 | 7 | 5 | 5.5 | 13 |
| Virk number | 25 | 18 | 10 | 7 | 6 | 5 | 4.5 |

Water temperature 21° C., pH 8.35

| | Moody's friction factor × 10³ | | | | | | |
|---|---|---|---|---|---|---|---|
| Reynolds number | 3 × 10³ | 5 × 10³ | 10⁴ | 2 × 10⁴ | 3 × 10⁴ | 4 × 10⁴ | 6 × 10⁴ |
| Prandtl number | 45 | 38 | 32 | 27 | 24 | 22 | 20 |
| 10 mm tube | 60 | 38 | 12 | 9 | 7 | 6 | 5 |
| 8 mm tube | 50 | 30 | 13 | 7 | 5 | 5 | 5.5 |
| Virk number | 25 | 18 | 11 | 7 | 6 | 5 | 4.5 |

From these three loop tests with a composition according to the invention it can clearly be seen that a substantial friction-reducing effect can be achieved in the temperature range 7–21° C. in a water of medium hardness and with a dosage of 2.0 kg per m³.

What is claimed is:

1. A method for reducing the flow resistance between a flowing, water-base liquid in a water-base liquid system and s solid surface comprising the step of adding to said water-base liquid system and a solid surface which comprises adding to said system at least one alkoxylated alkanolamide of the general formula

wherein R is a hydrocarbon group having 7–23 carbon atoms, A is an alkyleneoxy group having 2–4 carbon atoms and n is 2–12, and at least one ionic surfactant in a weight proportion between the alkoxylated alkanolamide and the ionic surfactant from 100:1 to 1:2 wherein the ionic surfactant is selected from the group consisting of anionic, cationic, and amphoteric or zwitterionic; wherein the anionic surfactant is selected from the group consisting of fatty acid soaps $R_1COO^-Me^+$, alkylpolyglycolethersulphates $R_1O(C_xH_{2x}O)_nSO_3^-M^+$, alkylsulphates $R_1OSO^-Me^+$, alkylsulphonates $R_1SO_3^-Me^+$, alkylarenesulphonates $R_1ArSO_3^-Me^+$, and alkylpolyglycolethercarboxylates $R_1O(C_xH_{2x}O)_nCHCOO^-Me^+$, where $R_1$ is a hydrocarbon chain with 8–22 carbon atoms, Ar is an aromatic hydrocarbon group, $Me^+$ is a monovalent cation, x is a number from 2–4 and n is a number from 1–4; wherein the cationic surfactant is selected from the group consisting of primary ammonium salts $R_1^+NH_3A^-$, secondary ammonium salts $R_1^+NHR'_2A^-$ and tertiary ammonium salts $R_1^+NHR'_2A^-$, where $R_1$ is a hydrocarbon chain with 8–22 carbon atoms, R' is methyl, ethyl, propyl or hydroxyethyl group and $A^-$ is a monovalent anion; and wherein the amphoteric or zwitterionic surfactant contains I) one or more monovalent hydrophobic groups forming a hydrophobic portion containing 10–36 carbon atoms, ii) one or more primary, secondary or tertiary amine groups or quaternary ammonium groups, and iii) one or more carboxylic groups having a molecular weight of less than 1400.

2. The method of claim 1 wherein at least half of the alkyleneoxy groups in the alkoxylated alkanolamide are ethyleneoxy groups.

3. The method of claim 2 wherein A is an ethyleneoxy group.

4. The method of claim 2 wherein the water-based liquid system has a hardness corresponding up to 500 ppm $CaCO_3$ or contains up to 5 grams of salt per liter.

5. The method of claim 2 wherein the crystallization temperature for the mixture of the alkoxylated alkanolamide and the ionic surfactant is below the lowest temperature of the water-based system.

6. The method of claim 5 wherein the water-based system is a cooling medium with a temperature below 30° C.

7. The method of claim 1 wherein the mixture of the alkoxylated alklanolamide and the ionic surfactant is added in an amount of 0.1–10 kg/m³ of the water-based system.

8. The method of claim 1 wherein R is a hydrocarbon group having 11–23 carbon atoms, n is 2–8, and the weight proportion between the alkoxylated alkanolamide and the ionic surfactant is in the range of from 50:1 to 1:1.

9. The method of claim 1 wherein the amphoteric or zwitterionic surfactant contains i) one or two monovalent hydrocarbon groups forming a hydrohobic portion containing 10–36 carbon atoms, ii) one or two primary, secondary or tertiary amine groups or quaternary ammonium groups iii) one or two carboxylic groups having a molecular weight of less than 1400.

* * * * *